United States Patent [19]

Stuart

[11] 4,068,972

[45] Jan. 17, 1978

[54] GOLF PEG SCORE CARD

[76] Inventor: Clifford C. Stuart, 1505 Village Ave., Loveland, Colo. 80537

[21] Appl. No.: 635,978

[22] Filed: Jan. 5, 1976

[51] Int. Cl.[2] .......................... G09B 19/22; G08B 5/00

[52] U.S. Cl. .......................................... 283/49; 235/90; 116/136

[58] Field of Search ............................ 283/49; 235/90; 116/136

[56] References Cited

U.S. PATENT DOCUMENTS

| | | | |
|---|---|---|---|
| 585,302 | 6/1897 | Zerrahn | 116/136 X |
| 733,834 | 7/1903 | Glidden | 116/136 |
| 1,224,452 | 5/1917 | Eaton et al. | 283/49 |
| 1,266,426 | 5/1918 | De Tullio | 116/136 |
| 2,113,369 | 4/1938 | Bochicchio | 235/90 X |

*Primary Examiner*—Stephen C. Pellegrino
*Attorney, Agent, or Firm*—Hugh H. Drake

[57] ABSTRACT

A golf score card takes the form of a single-piece card together with eighteen pegs numbered from one through eighteen for the purpose of keeping one's golf score without a paper and pencil. The card can be attached to a golf bag, cart or carried in the pocket and it is designed to be durable over a period of years. The arrangement is such as to enable the score to be recorded on each hole by inserting a peg numbered for that particular hole into the hole representing that score on the score card.

1 Claim, 6 Drawing Figures

GOLF PEG SCORE CARD

The present invention pertains to a score card for use in connection with the game of golf.

A general object of the present invention is to provide a score card which may be attached to a golf bag, a cart or carried in the pocket and which is designed to be durable over a period of years.

Another object is to permit the score to be recorded in each hole by inserting a peg numbered for that particular hole into the hole representing that score on the score card.

In accordance with the invention, a golf scoring apparatus comprises a rigid planar substrate, means defining an array of holes distributed across a major surface of that substrate in a pattern of rows and columns, and there being means defining a total of a predetermined number of vertical columns and nine horizontal rows of those holes. A plurality of indicia are distributed in one direction in a horizontal row adjacent to one end of the columns and individually disposed adjacent to respective different successive ones of all but two of the columns. The indicia individually represents successively different respective numbers in a series of numbers in order from the "one" through a number that is two less than the total number of the columns. A plurality of eighteen pegs are manually securable removably in the holes. Each individual different one of the pegs is marked to indicate a respective different one of the numerals from "one" through "eighteen", and the pegs are securable in the holes in selective different relative orientations with respect to the orientation of the marking to indicate the numerals.

The invention may best be understood by reference to the following description taken in connection with the accompanying drawings in which.

As specifically embodied, a gold score card 20 is in the form of a unitary or one-piece card of a plastic or wood and includes a total of 108 one-quarter inch holes 22 arranged in vertical columns 24 and horizontal rows 26. There are nine of holes 22 in each of vertical columns 24 and twelve of holes 22 in each of horizontal rows 26. Across the top of columns 24 is the legend or word "score".

Laterally distributed across card 20, and disposed beneath the word "score", are a succession of numbers or headings respectively over each of the twelve columns 24 of vertically-displaced holes 22. The outermost ones of columns 24 are headed with the word "hole" so as to denote the number of a hole played on the golf course during use. The remaining ones of columns 24 are numbered successively from one through ten.

Figure 1:
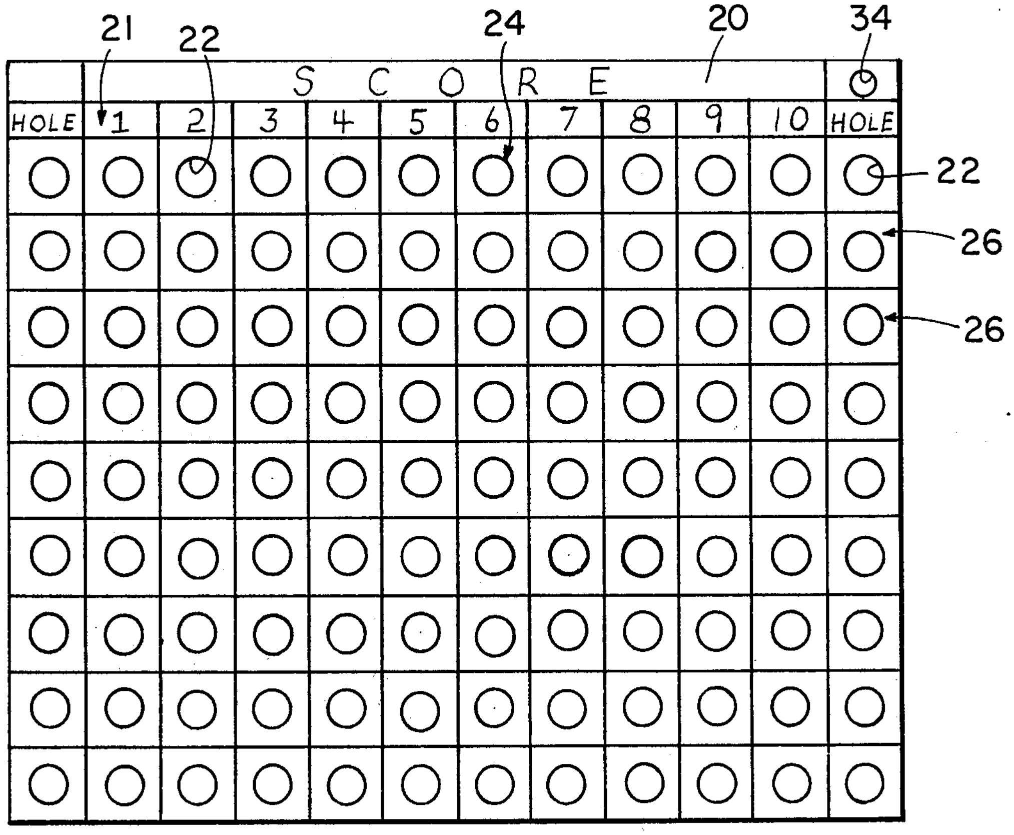
FIG. 1 is a plan view of a score card constructed in accordance with the present invention.
Figure 2:
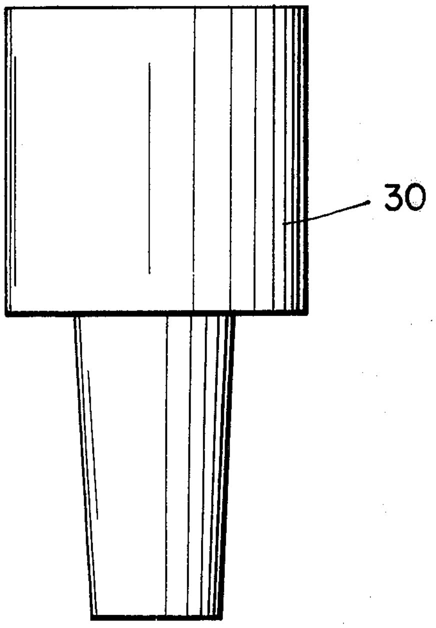
FIG. 2 is a side-elevational view of a peg insertable within any one of a plurality of holes provided in the device as shown in FIG. 1.
Figure 3:
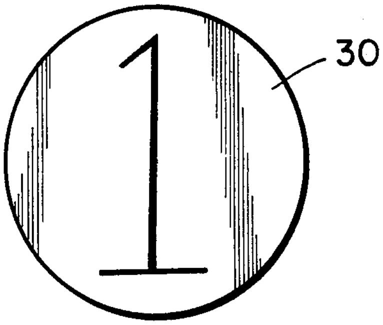
FIG. 3 is a plan view of the peg shown in FIG. 2.
Figure 4:
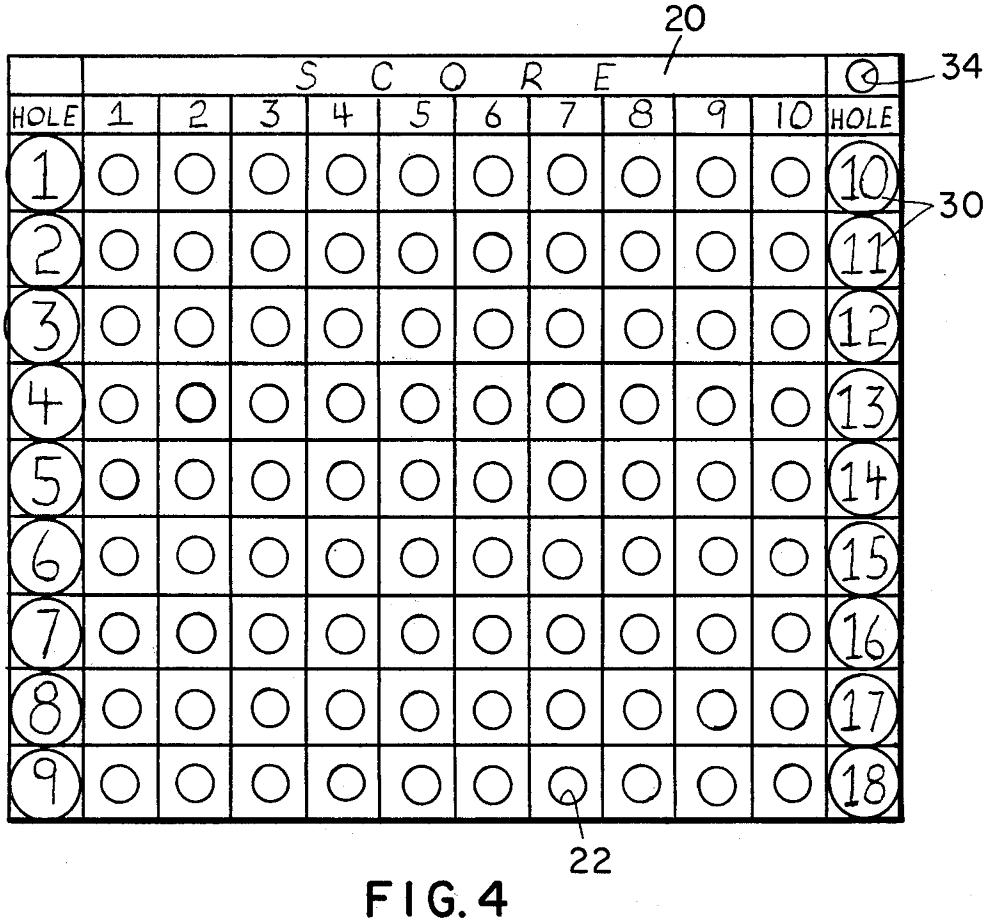
FIG. 4 is a plan view of the device shown in FIG. 1 with a plurality of the pegs, as shown in FIGS. 2 and 3, disposed in certain positions.
Figure 5:
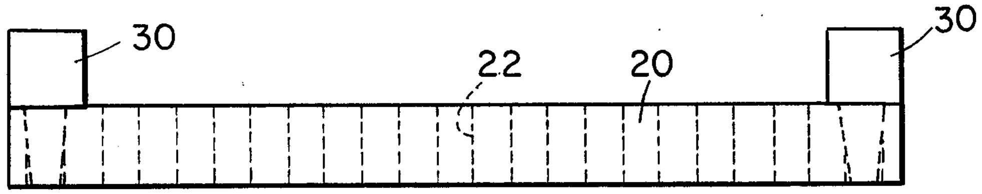
FIG. 5 is a side-elevational view of the assembly as shown in FIG. 4.

A plurality of pegs 30 are insertable within holes 22. Pegs 30 that are numbered from one through nine are, in FIG. 4, shown as being placed consecutively in the first column 24 of nine holes on the far left side of card 20. The pegs 30 numbered from ten through eighteen are placed consecutively in the far right one of columns 24. In a particular embodiment, card 20 is formed of white-molded plastic and has a size of 5 inches × 6 inches × ½ inch. The indicated different lines and lettering are engraved and filled with a black material so as to separate the hole number from the score. As stated, the scoring notation takes the form of the ten vertical columns of holes 22 numbered from one through ten.

Also in the particular embodiment, pegs 30 are formed individually from plastic so as to be one inch high and one-half inch in diameter. Pegs 30 are of a round shape and consist of a one-half inch round upper portion or top and a one-half inch long tapered round base in order to fit snugly into holes 22 in the score card. There are a total of eighteen pegs 30, with each peg being engraved and inked on its top surface with a gold colored number. These eighteen pegs 30 are numbered consecutively from one through eighteen.

For use, pegs 30 numbered one through nine are placed in the first vertical column of holes 22 under the heading "hole" on the far left of the score card. The pegs numbered ten through eighteen are placed in the last or most right-hand vertical column of holes 22 under the additional heading "hole". An additional small hole 34 is provided at the upper right-hand corner of card 20 for the purpose of receiving a chain so as to attach the card to a golf cart or bag.

The ones of pegs 30 numbered from one to nine represent the first nine holes of the golf course and are constructed of green-molded plastic with gold ink and engraved numbers on top. The ones of pegs 30 numbered from ten through eighteen are of red-molded plastic with engraved and inked numbers of gold on their tops and which represent the second nine holes of the golf course. The total card, therefore, accommodates the playing of eighteen holes of golf.

Card 20 is used by inserting the appropriately numbered one of pegs 30 into the corresponding hole representing the number of the score achieved on that hole. That is, if a person receives a score of four on the first hole, he places the one of pegs 30 which bears number one into the hole numbered four under the label score. Only the horizontal distribution of holes 22 are numbered, from one through ten as depicted. The vertical distribution of holes 30 become numbered by use of the removable pegs 30 which represent the number of the golf holes played.

Figure 6:
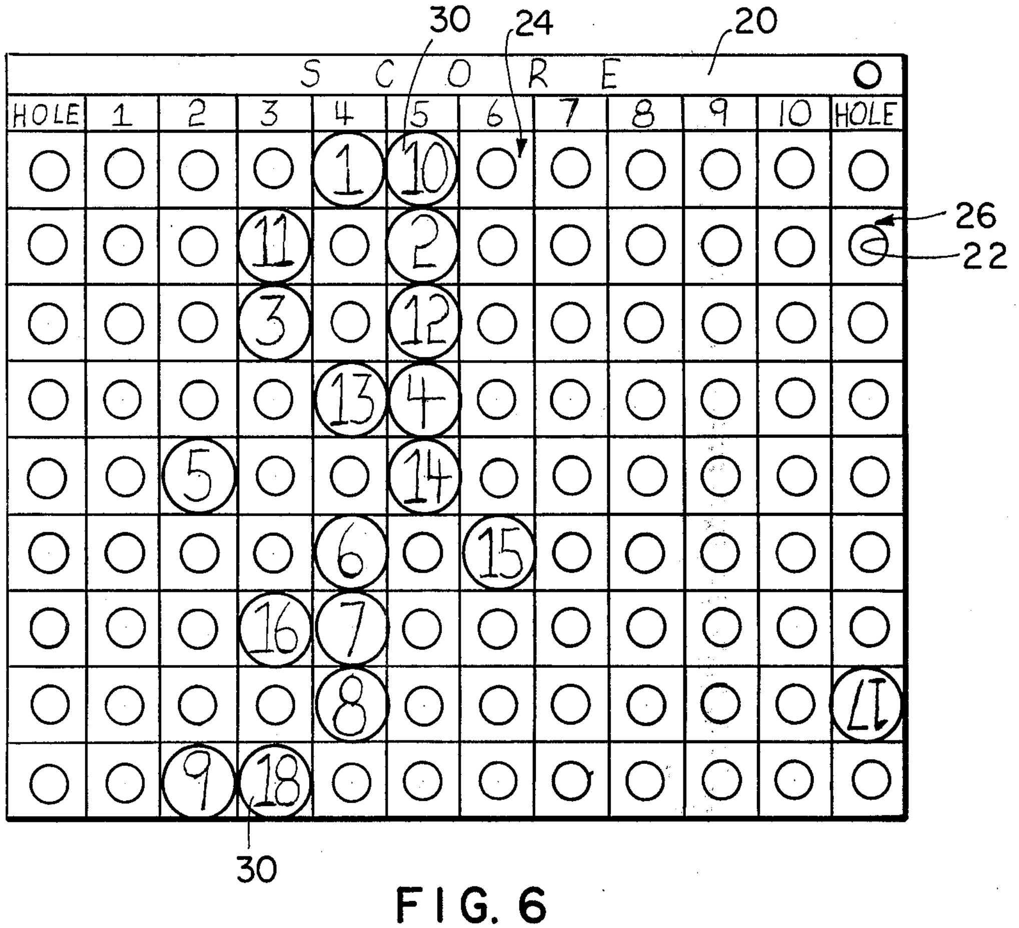
FIG. 6 is a plan view similar to that of FIGS. 1 and 4 but with different ones of the pegs inserted in different positions.

When, during play on the second nine, the same score is achieved on a hole numerically corresponding to that on the first nine, the peg which is used is rotated upside down to accommodate that scoring. That is, when the same score, for example, is achieved on golfing hole seventeen as was achieved on golfing hole eight, the one of pegs 30 bearing the number seventeen is rotated upside down to remind the golfer that he has completed that score and that he has to score double for the original one of pegs 30 which bears the number eight and which otherwise would be in that place. Thus, the total score represented in FIG. 6 is seventy one.

I claim:

1. A golf scoring apparatus comprising:

a rigid planar substrate;

means defining an array of holes distributed across a major surface of said substrate in a pattern of rows and columns, there being a total of a predetermined number of vertical columns and nine horizontal rows of said holes;

a plurality of indicia distributed in one direction in a horizontal row adjacent to one end of said columns and individually disposed adjacent to respective different successive ones of all but two of said columns, said indicia individually representing successively different respective numbers in a series of numbers in order from the number "one" through a number that is two less than the total number of said columns;

a plurality of eighteen pegs manually securable removably in said holes, each individual different one of said pegs being marked to indicate a respective different one of the numerals from "one" through "eighteen", and said pegs being securable in said holes in selectively different relative orientations with respect to the orientation of the marking to indicate said numerals.

* * * * *